Jan. 2, 1968     T. A. GRAHAM ET AL     3,361,454

PENSTOCK COUPLING

Filed Aug. 11, 1966     2 Sheets-Sheet 1

INVENTORS.
THOMAS A. GRAHAM
BY WILSON W. FRANKLIN

Owen, Wickersham & Erickson
ATTYS.

Jan. 2, 1968   T. A. GRAHAM ET AL   3,361,454
PENSTOCK COUPLING
Filed Aug. 11, 1966   2 Sheets-Sheet 2
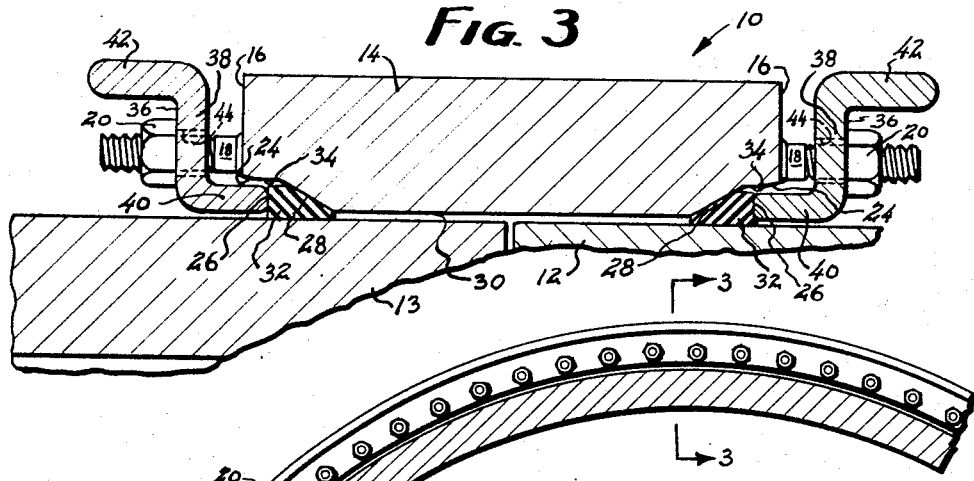
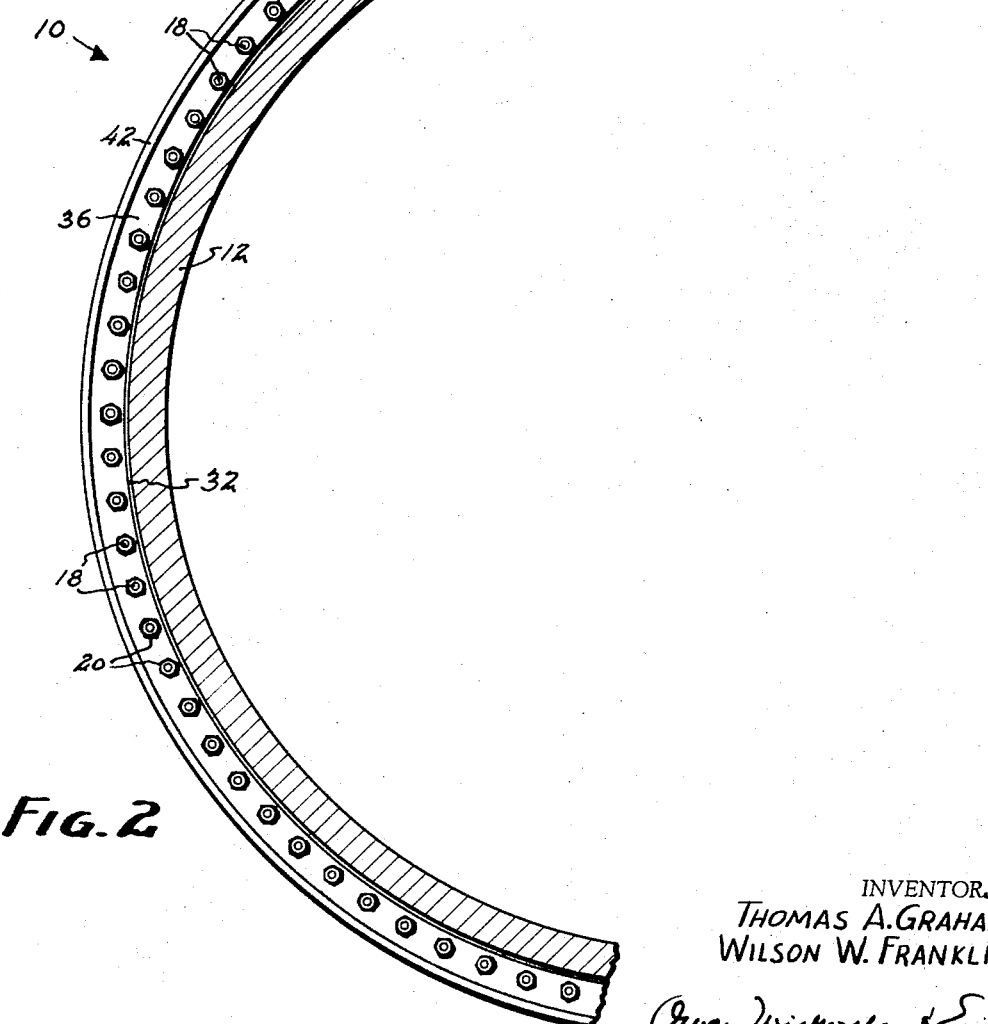
INVENTORS
THOMAS A. GRAHAM
WILSON W. FRANKLIN
Owen, Wickersham & Erickson
ATTYS.

United States Patent Office 3,361,454
Patented Jan. 2, 1968

3,361,454
PENSTOCK COUPLING
Thomas A. Graham, San Carlo, and Wilson W. Franklin, San Francisco, Calif., assignors to Smith-Blair, Inc., San Francisco, Calif., a corporation of California
Filed Aug. 11, 1966, Ser. No. 571,895
1 Claim. (Cl. 285—369)

ABSTRACT OF THE DISCLOSURE

A pipe coupling in which a cylindrical sleeve surrounds the ends of adjacent pipes. Each end of the sleeve is provided with annular depressions opening at the inner surface and a number of studs secured to the end faces of the sleeve contiguous to each of the depressions. A yielding gasket member is mounted in each depression and is pressed into sealing engagement with the sleeve and pipes by ring followers of Z-shape mounted on the studs and bearing against the gaskets. The positioning of the studs close to the openings reduces the moments which distort the rings and the Z-shape provides great strength against distortion.

---

This invention relates to pipe couplings and particularly to couplings for relatively large diameter conduits such as penstocks and the like.

The general object of the present invention is to provide an improved coupling for large conduits that will be relatively easy to assemble and install despite its large size and weight, that will provide a secure fluid-tight seal even at unusually high fluid pressure, and that will be durable and maintenance free for long periods and under a wide range of operating conditions.

Another important object of the present invention is to provide a coupling for large conduits that is particularly well adapted for ease and economy of manufacture.

Still another important object of the present invention is to provide a coupling for large pipes wherein the bolt circle on follower rings is reduced to a minimum diameter thereby practically eliminating any bending movement tending to rotate the main body flange of the follower ring. Previous attempts to solve this problem in prior art devices resulted in the use of relatively heavy follower ring sections. This not only made the coupling more difficult to assemble but also costly to manufacture.

The aforesaid and other objects of the present invention are accomplished by a combination of coupling elements which includes, broadly, a sleeve that surrounds the pipe at the joint, a pair of yieldable gaskets at opposite ends of the sleeve adapted to fit within recesses formed by the sleeve and the adjoining pipe end, and follower rings at the ends of the sleeve, both of which are adapted to be pressed axially against the gaskets to perfect a fluid-tight seal. The force for pressing the follower rings in the aforesaid manner is provided by nuts that are threaded to studs which extend axially from the end faces of the sleeve and through matching openings in the follower rings.

Other objects, features, and advantages will appear from the following description of a preferred embodiment of the invention, taken together with the attached drawings, in which:

FIG. 2 is a fragmentary end view of the coupling shown in FIG. 1;

FIG. 3 is an enlarged fragmentary view in elevation and in section taken along line 3—3 of FIG. 2.

Figure 1:
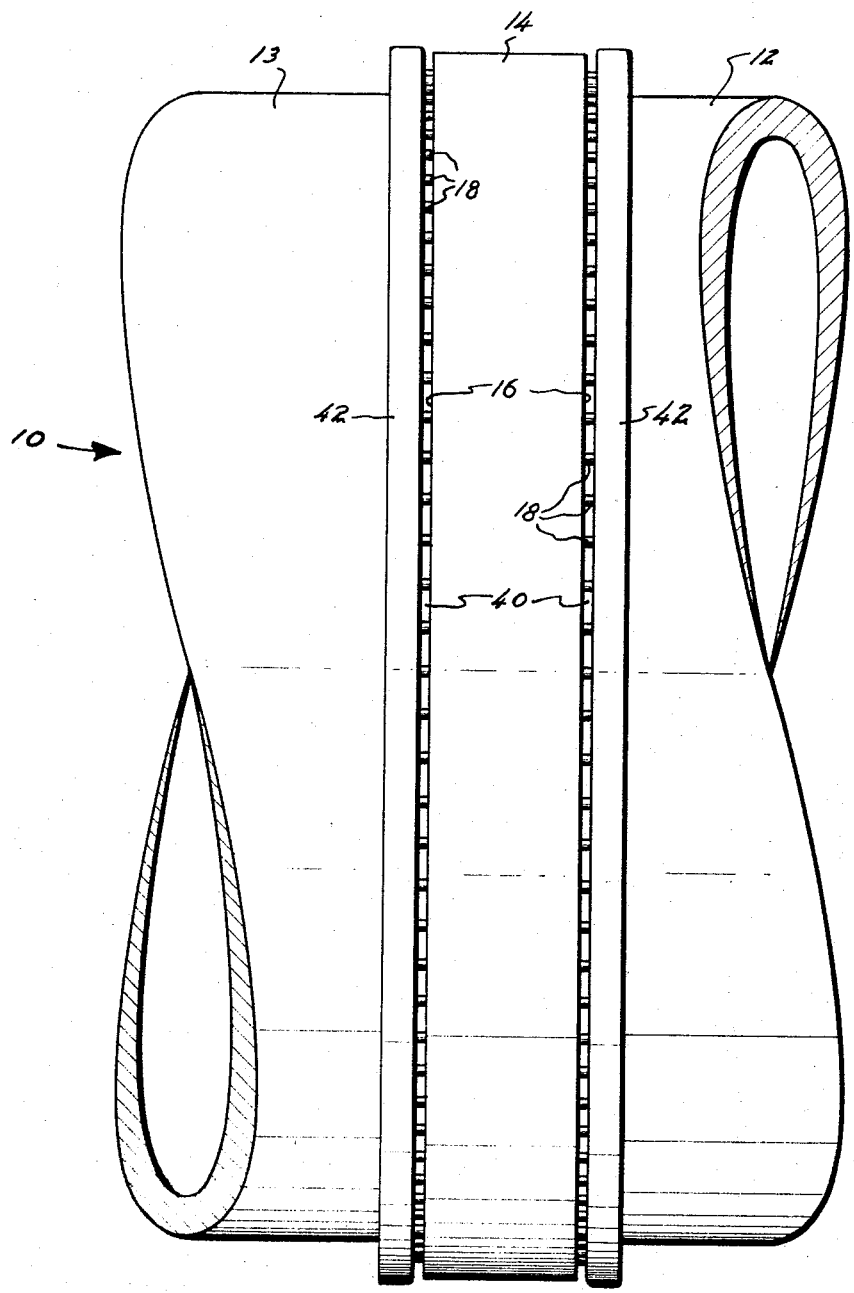
FIG. 1 is a view in elevation of a coupling embodying the principles of the invention, shown installed at the joint of relatively large pipe sections.

In the drawings, FIG. 1 shows a coupling 10 according to the present invention which is installed at the joint of two abutting pipe sections 12 and 13 thereby providing a fluid-tight seal. This coupling is particularly adaptable for use on pipe sections that are relatively large and heavy (e.g., 100 inches in diameter and larger), such as large water supply conduits or penstocks for dams and the like.

The coupling comprises a central sleeve 14 having an inside diameter that is only slightly larger than the outer diameter of the flangeless or plain end pipes for which the coupling is to be used. Since the present coupling is used on large diameter pipes it must have sufficient strength to withstand large pressure loads (e.g., up to 700 p.s.i.). The sleeve 14 thus may have a substantial thickness which can be in the range of 1½ inches to 3 inches or greater depending on the coupling size and intended use. Sleeves of this size may be fabricated from rolled steel plate of uniform thickness which is first formed into one or more cylindrical segments that are then welded together along axial seams.

The end faces 16 of the sleeve are flat surfaces that are perpendicular to the sleeve axis. To each of these end surfaces of the sleeve are welded a series of axially extending studs 18 which are spaced apart circumferentially at equal intervals, the spacing and diameter of the studs being determined by the pressure range within which the pipe is to be operated. Each stud has a threaded portion adapted to fit a standard machine nut 20. The studs 18 are preferably of a type that are commercially available which are pre-formed with flux in an end cavity. An apparatus is provided to hold the stud in position at the desired location and weld it electrically, the built-in flux providing all the welding agent required. Such stud welding machines are also commercially available. Other means may be applied for attaching the studs if desired, and the invention is not limited by the method just described. However, because of the large number of studs required for couplings of the present size, the welding method provides particular advantages, one being the speed with which the fabrication of our coupling can be accomplished.

At each end of the sleeve a compound beveled inner edge or flared depression is formed by a first slightly tapered surface 24 extending inwardly from each sleeve end surface 16 for a predetermined distance. This tapered surface becomes a substantially cylindrical surface 34 extending for a short distance which then becomes a more pronounced tapered surface 28 that extends further along and terminates at the inner cylindrical wall of the sleeve 30. A wedge-shaped elastomeric gasket 32 which extends around the end of the pipe section also lies adjacent the tapered sleeve surface 28. Each gasket is provided with a transverse end face 26 at its thickest end having an outer diameter that is slightly less than the cylindrical sleeve surface 34. When force is applied to this latter end face the gasket 32 is forced into the peripheral cavity formed between the beveled edge of the sleeve and the outer pipe wall, thereby providing a seal between them.

The means for providing the axial force on the gaskets are a pair of follower rings 36. Each ring is preferably made from rolled steel stock that is cut to the desired length, rolled to the predetermined hoop shape and welded together. Also, each ring 36 preferably has a generally Z-shaped cross section with a central transverse body portion 38 and inner and outer flanges 40 and 42. The latter flanges provide hoop strength and rigidity to the follower ring. The body portion 38 of each follower ring is provided with holes 44 which are spaced apart circumferentially to match the spacing of the sleeve studs 18. The actual spacing and number of studs required for a particular coupling may be determined by standard engineering procedures. When each follower ring is in place with the studs through the mating holes, the inner flange 40 is aligned with the end face 26 of the gasket 32.

The first slightly tapered surface 24 at each end of the sleeve performs an important function by providing a guiding or centering surface for the follower ring as the coupling is assembled. Due to the large size of the couplings of the present invention and also their considerable weight, a problem heretofore arose of aligning the follower ring adequately so that its inner flange would properly fit within the sleeve cavity adjacent the pipe and engage the gasket. The surface 24 provides the guiding surface that solves this problem.

The present coupling 10 offers particularly important advantages with respect to its installation on large pipes because of its structural arrangement. To install the coupling, one follower ring 36 is first placed over the end of one pipe section to be coupled and a gasket 32 is then placed around the same pipe near its end and adjacent the inner flange of the follower ring. One end of the sleeve is now placed on the pipe with its other end extended beyond the pipe end. The wedge-shaped gasket already on the pipe is thus situated within the beveled cavity formed in the end of the sleeve. With the studs of the sleeve positioned through the holes of the follower ring already in place, the nuts can then be applied to the studs and are taken up to the proper tension to position the inner flange of the follower ring with respect to the gasket, thereby securing the coupling to one pipe end. Thus, the heavy sleeve 14 of the coupling can be rigidly connected to one pipe section before it is connected to another section. This procedure affords an important advantage because with the sleeve attached to a pipe section the combined unit can be maneuvered more easily to accomplish the connection with a follower on the next section. Another gasket 32 and a second follower ring 36 are now placed around the end of the other pipe section to be coupled and the two pipe sections can be brought together until the studs 18 of the sleeve 14 are extended through the holes of the second follower, and nuts are then applied and tightened. As the nuts are taken up to the torque necessary to seat the gaskets a relatively small amount of bending moment is exerted on the transverse body portion 38 of each follower ring. This is because of the location of the stud members 18 which, in being welded directly to the end faces of the sleeve, thereby reduce the length of the moment arm of the bolt force to a minimum. The further advantage to this arrangement is that the follower rings can be smaller and lighter because of the decreased bending strength requirements. For even a small number of couplings of the penstock type this factor provides significant cost savings.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:
1. A coupling for providing a fluid-tight joint between two relatively large diameter flangeless pipe sections comprising:
   a thick cylindrical metal sleeve having circular end faces, each said end face having an inner edge shaped to form a flared annular depression;
   a plurality of stud members with threaded portions fixed to and extending axially from both of said end faces, said stud members being spaced apart circumferentially thereon at predetermined intervals;
   a pair of annular elastomeric gaskets, each being located around a said pipe section being coupled and adjacent an annular flared depression of said sleeve;
   a pair of annular solid ring followers at opposite ends of the sleeve, each having a central transverse portion with holes spaced at the same intervals as the stud members on said sleeve, the threaded portions of said studs extending through said holes, and an integral inner flange axially extending from said central portion and aligned with a said gasket, an outer flange at the opposite side of the central portion extending axially in an opposite direction from the first flange; and nuts threadedly engaged with said studs extending through the holes of each said follower ring to move it axially, thereby forcing the aligned gasket into sealing position within said flared depresstion, each said gasket having a generally wedge-shaped cross section and each said annular depression at each end of said sleeve is formed by a beveled surface at the sleeve inner edge having a relatively small angle of taper, an inner beveled surface having a relatively greater angle of taper substantially equal to the angle of taper of said wedge-shaped gasket, and said stud members being fixed to said end faces contiguous to the edge of the depressions and the nuts overlapping the edge of the depression whereby at least a part of each nut overlaps the outer end of the inner flange and places it in direct axial compression against the gasket.

References Cited
UNITED STATES PATENTS

| | | | |
|---|---|---|---|
| 1,423,754 | 7/1922 | Clark | 285—413 |
| 1,434,952 | 11/1922 | Johnson | 285—356 X |
| 2,010,769 | 8/1935 | Perry | 285—356 X |
| 2,538,393 | 1/1951 | Stecher | 285—356 X |
| 2,701,731 | 2/1955 | Risley | 285—369 X |
| 3,002,772 | 10/1961 | Schustack | 285—369 X |

CARL W. TOMLIN, *Primary Examiner.*

W. L. SHEDD, J. L. KOHNEN, *Assistant Examiners.*